J. BERG.
LATERAL GEAR DRIVE FOR TRAVEL INDICATORS.
APPLICATION FILED JUNE 28, 1916.

1,213,576. Patented Jan. 23, 1917.

Witnesses

Inventor
Joseph Berg
by Burton Burton
his Att'ys

UNITED STATES PATENT OFFICE.

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

LATERAL GEAR-DRIVE FOR TRAVEL-INDICATORS.

1,213,576.     Specification of Letters Patent.     Patented Jan. 23, 1917.

Application filed June 28, 1916. Serial No. 106,378.

*To all whom it may concern:*

Be it known that I, JOSEPH BERG, a citizen of the United States, residing at Chicago, in the county of Cook and State of Illinois, have invented new and useful Improvements in Lateral Gear-Drives for Travel-Indicators, of which the following is a specification, reference being had to the accompanying drawings, forming a part thereof.

The purpose of this invention is to provide an improved device for transmitting driving power for operating a travel indicator on an automobile from a power-transmission shaft of the vehicle-propelling train.

It consists in the elements and features of construction shown and described as indicated in the claims.

Figure 1:
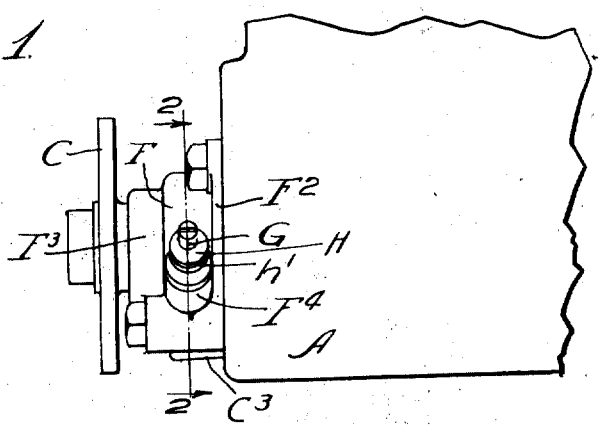
Figure 3:
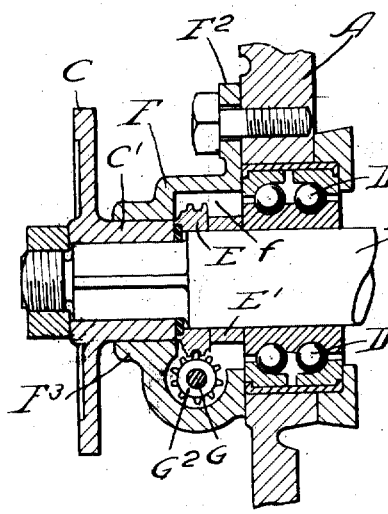
Figure 2:
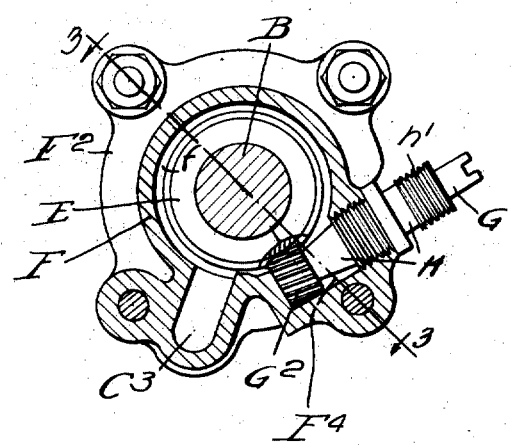

In the drawings:—Figure 1 is a side elevation of a portion of the gear transmission housing which with the transmission shaft protruding therefrom is provided with devices constituting this invention. Fig. 2 is a section at the line, 2—2, on Fig. 1. Fig. 3 is a section at the line, 3—3, on Fig. 2.

The gear transmission housing, A, is of a familiar type and design common to many automobile-propelling trains having a power-transmitting shaft, B, journaled in it. Said housing has the shaft protruding from it, and provided on the protruding portion with a flanged coupling, C, for connecting it with a further continuation of said shaft, usually the propeller shaft, not shown. In the customary construction of these parts, the coupling, C, comprises the sleeve or hub, $C^1$, which is adapted for driving connection with the shaft, B, as, by having a square opening to engage the squared end of said shaft, there being a short space on the protruding portion of said shaft back of said coupling sleeve for a stop collar made fast on the shaft to abut against the inner ball race of the ball bearing shown at D. In the present construction such stop collar is removed and the interval on said shaft, B, between the inner end of the hub or sleeve, $C^1$, of the coupling, C, and the bearing is occupied by a gear, E, pressed or keyed fast onto the shaft before the coupling is applied thereto. This gear for the particular purpose for which it is required is a spiral worm gear as illustrated; and if the space between the bearing and the coupling, C, be more than is required for the gear proper, said gear may be provided with a hub or sleeve terminal, $E^1$, completing the occupancy of the space; or, this space may be occupied by a mere spacing ring equally well represented by the part designated $E^1$.

F is a supplemental housing having a cavity, $f$, which incloses the gear, E, and having a flange, $F^2$, by which said supplemental housing is bolted fast to the main gear housing, A, and preferably also a sleeve or hub, $F^3$, at the opposite end from said flange in which the sleeve or hub, $C^1$, of the coupling, C, telescopes and is journaled. The supplemental housing, F, is provided with an entrance, $F^4$, into the cavity $f$, of said supplemental housing in which the gear, E, is inclosed, and in said entrance there is journaled a shaft, G, a sleeve, H, being provided and screwed into said entrance, which is threaded at the outer end for that purpose, for so journaling the shaft in said entrance. At the inner end of the sleeve journal bearing, H, a gear pinion, $G^2$, is fast on the shaft, G, and meshes with the gear, E, said gear pinion being of the spiral type to properly coöperate with said worm or spiral gear, E. The outer end of the shaft, G, is adapted for driving engagement with a flexible shaft in the familiar way, the journal bearing or sleeve, H, being similarly provided for connection with the housing of such flexible shaft, as indicated by the exterior thread, $h^1$, thereon. The device is thus adapted for connection with it of a shaft by which driving power may be transmitted to an odometer, speedometer or other travel-indicating device which may be mounted at any convenient point upon the vehicle and is not shown.

It will be understood that the supplemental housing, F, is designed to contain lubricant for lubricating the intermeshing gears, E and $G^2$; and for properly applying the lubricant said supplemental housing is provided with a wick pocket shown at $C^3$, opening into the cavity of the housing at a position for causing the wick to wipe upon the spiral gear, E, at a point proximate to the intermeshing therewith of the gear, $G^2$.

I claim:—

1. In combination with a power transmitting shaft, a gear housing in which it is journaled and from which it protrudes; a coupling member on the protruding end of said shaft; a gear fast on the protruding portion of said shaft back of the coupling; a supplemental housing member secured to the main gear housing and inclosing said gear, said supplemental housing having a lateral entrance to the cavity in which the gear is inclosed; a bearing sleeve intruded through said entrance and made fast therein; a shaft journaled in said sleeve bearing, and a gear on the inner end of said shaft meshing with the gear in the supplemental housing.

2. In combination with a power transmitting shaft, a gear housing in which it is journaled and from which it protrudes and a coupling fast on the protruding end of said shaft, a gear fast on the protruding portion of the shaft back of the coupling, a supplemental housing secured to the main gear housing and inclosing said gear, said supplemental housing having a lateral entrance leading into the housing cavity, a shaft journaled in said entrance, and a gear on the inner end of said shaft meshing with the gear in said supplemental housing.

3. In combination with a power transmitting shaft, a gear housing in which it is journaled, and from which it protrudes and a coupling fast on the protruding end of said shaft; a gear fast on the protruding portion of the shaft back of the coupling; a supplemental housing secured to the main gear housing and inclosing said gear, said housing having a lateral entrance leading into the housing cavity; a shaft journaled in said entrance, and a gear on the inner end of said shaft meshing with the gear in said supplemental housing, the coupling comprising a sleeve or hub portion which is longitudinally positioned by the gear in the supplemental housing, and said supplemental housing having a sleeve or hub extension which constitutes a journal bearing for the sleeve or hub of the coupling.

4. In combination with a power-transmitting shaft, a gear housing in which it is journaled, and from which it protrudes; a coupling fast on the protruding end of said shaft; a gear fast on the protruding portion of the shaft back of the coupling; a supplemental housing secured to the main gear housing and inclosing said gear, said housing having a lateral entrance leading into the housing cavity, a shaft journaled in said entrance, and a gear on the inner end of said shaft meshing with the gear in said supplemental housing, the coupling comprising a sleeve or hub portion which is longitudinally positioned by the gear in the supplemental housing, and said supplemental housing having a sleeve or hub extension which constitutes a journal bearing for the sleeve or hub of the coupling; the supplemental housing having a wick pocket opening into the housing cavity in the plane of the gear therein for holding a lubricating wick in contact with said gear in the housing.

In testimony whereof, I have hereunto set my hand at Chicago, Illinois, this 24th day of June, 1916.

JOSEPH BERG.